United States Patent [19]
Jehu

[11] 3,816,813
[45] June 11, 1974

[54] AUTOMATIC CONVERTER TESTER
[75] Inventor: Robert Ramsay Jehu, Nashua, N.H.
[73] Assignee: Spacetac Incorporated, Bedford, Mass.
[22] Filed: Jan. 24, 1972
[21] Appl. No.: 219,940

[52] U.S. Cl............................. 324/73 R, 324/130
[51] Int. Cl........................ G01r 1/02, G01r 15/12
[58] Field of Search............... 324/130, 73 R, 57 R

[56] References Cited
UNITED STATES PATENTS

| | | | |
|---|---|---|---|
| 3,064,193 | 11/1962 | Grubb et al. | 324/120 |
| 3,201,781 | 8/1965 | Holland | 324/120 |
| 3,473,122 | 10/1969 | Holt | 324/120 |
| 3,579,103 | 5/1971 | Russell | 324/73 R |
| 3,609,536 | 9/1971 | Danofsky | 324/57 R |

Primary Examiner—Alfred E. Smith
Assistant Examiner—Ernest F. Karlsen
Attorney, Agent, or Firm—Joseph S. Iandiorio

[57] ABSTRACT

An automatic converter testing system including a digital-to-analog converter, means for providing a test input to the digital-to-analog converter, an analog-to-digital converter responsive to the output from the digital-to-analog converter, means for enabling the analog-to-digital converter to accept input from the digital-to-analog converter and produce a digital output as a function thereof, means for measuring the input to the analog-to-digital converter from the digital-to-analog converter, means for detecting a change in the digital output of the analog to digital converter, and means responsive to the means for detecting, for reading out the measured input and simultaneous output of the analog-to-digital converter, one of the converters being a reference instrument, the other being the instrument under test.

15 Claims, 4 Drawing Figures

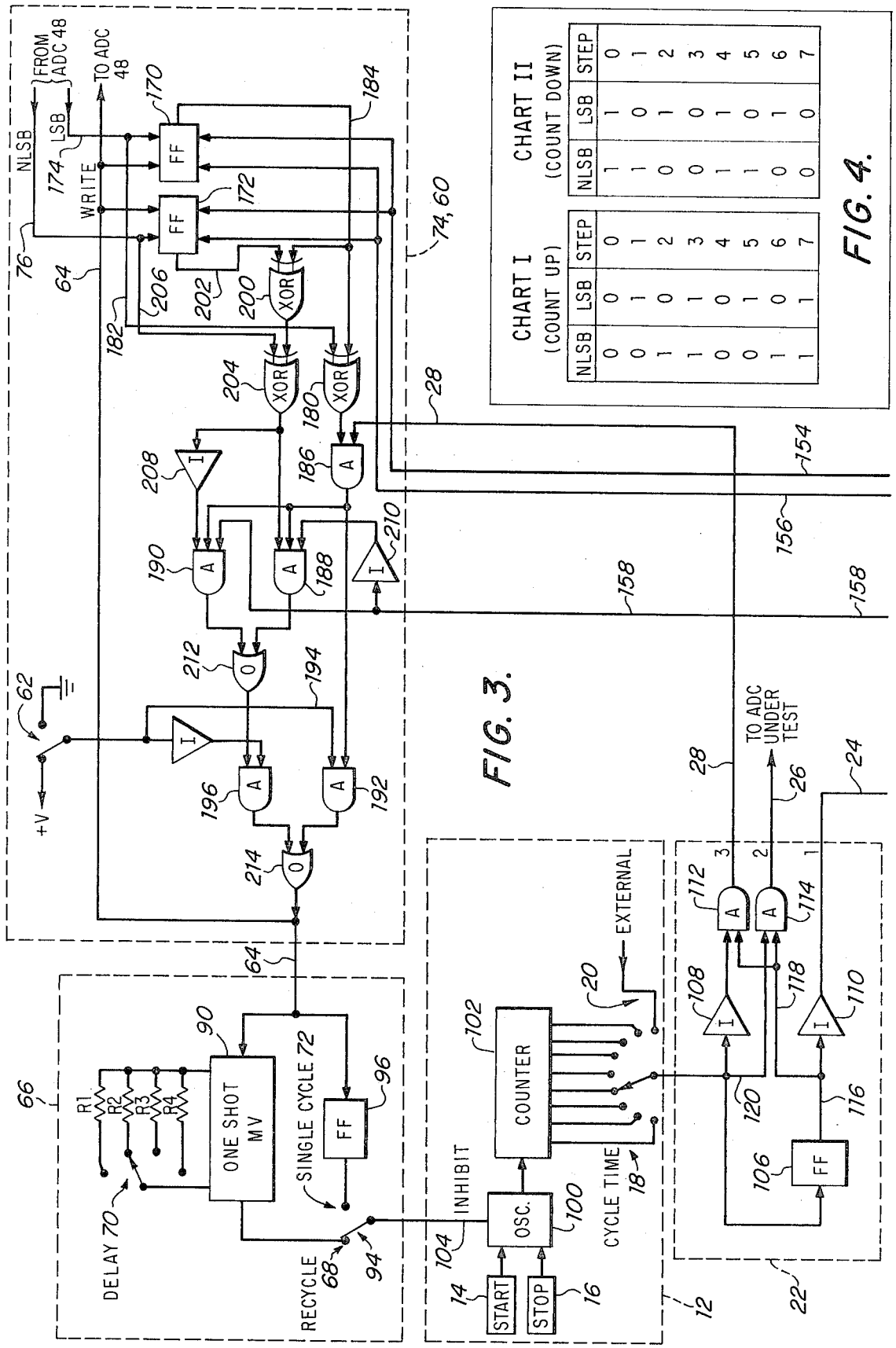

AUTOMATIC CONVERTER TESTER

FIELD OF INVENTION

This invention relates to an automatic system for testing converters, and more particularly to such a system for testing analog-to-digital converters and for testing digital-to-analog converters.

SUMMARY OF INVENTION

It is an object of this invention to provide an efficient, compact, automatic testing system for submitting a series of test inputs to a converter under test and producing a read out of the values of the test inputs and simultaneous outputs of that converter.

This invention features an automatic converter testing system including a digital-to-analog converter and means for providing a test input to the digital-to-analog converter. An analog-to-digital converter is responsive to the output from the digital-to-analog converter. There are means for enabling the analog to digital converter to accept an input from the digital-to-analog converter to produce a digital output as a function thereof. There are means for measuring the input to the analog-to-digital converter from the digital-to-analog converter and means for detecting a change in the digital output of the analog-to-digital converter. Means responsive to the means for detecting read out the measured input and simultaneous output of the analog-to-digital converter. One of the converters is a reference instrument and the other is the instrument under test.

DISCLOSURE OF PREFERRED EMBODIMENT

Other objects, features and advantages will occur from the following description of a preferred embodiment and the accompanying drawings, in which:

FIG. 3 is a more detailed diagram of a portion of FIG. 1 including the write circuit, timer, sequencer, LSB change detector and jitter-bypass circuit; and FIG. 4 includes Charts I and II depicting operation of the circuit of FIG. 3.

Figure 1:
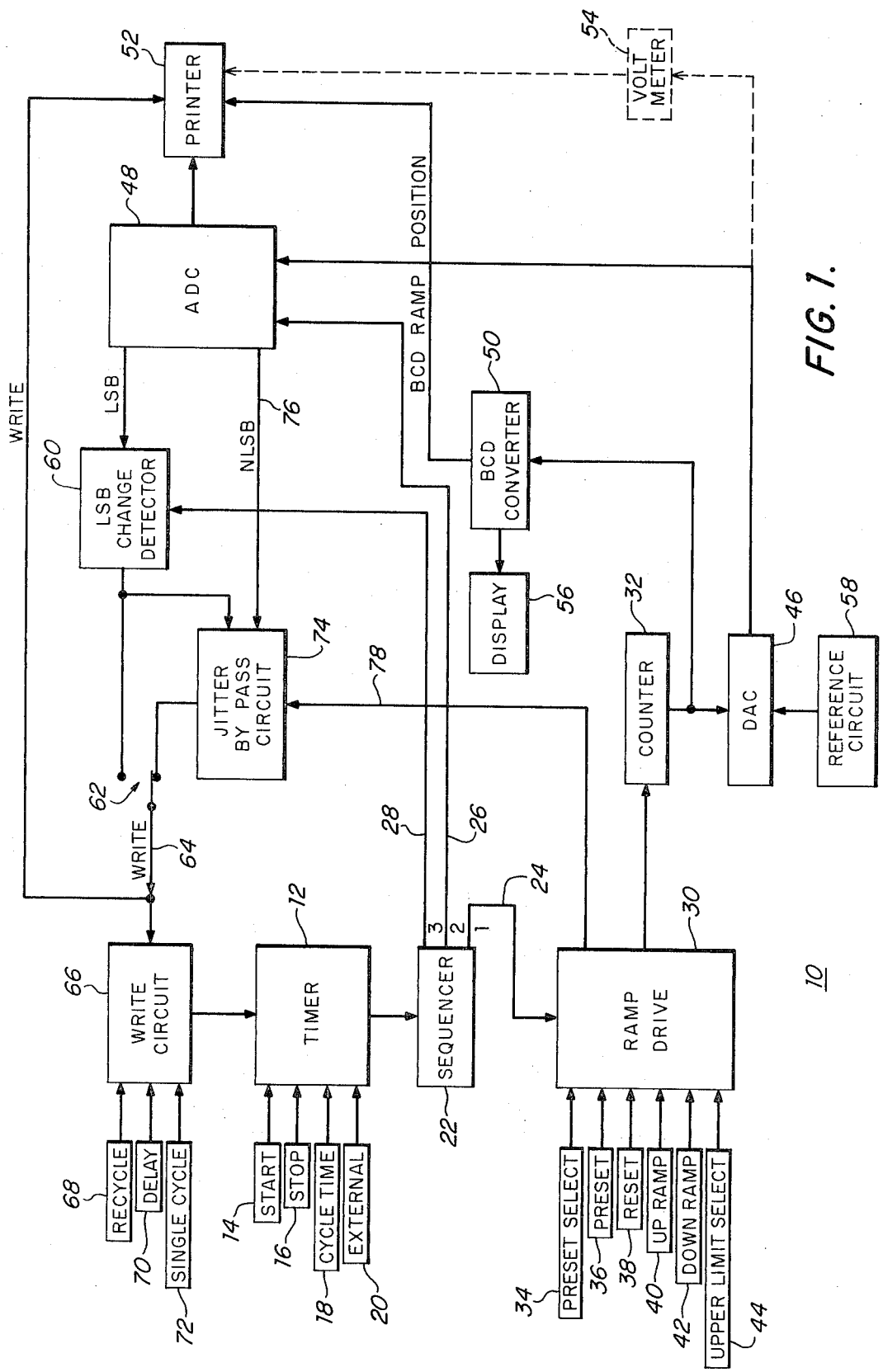
FIG. 1 is a block diagram of an automatic converter testing system according to this invention.

There is shown in FIG. 1 a converter testing system 10 including a timer 12 which provides clock signals to operate the system. Timer 12 is controlled by start switch 14, stop switch 16, cycle time selector switch 18, and an external feed switch 20. Cycle time selector switch 18 selects one of a number of available rates at which clock signals can be supplied by timer 12 and external feed switch 20 enables the use of an external timing signal in place of the clock signals generated by timer 12. The output of timer 12 is submitted to a sequencer 22 which provides three enabling signals on lines 24, 26, and 28 to operate various components of the system. The first signal in the sequence appears on line 24 connected to the input of ramp drive 30 which controls the operation of counter 32. Ramp drive 30 is controlled by preset selector switches 34, a preset switch 36, a reset switch 38, an up-ramp selector switch 40, a down-ramp selector switch 42, and an upper-limit select switch 44. Counter 32 is typically a 12-stage counter that counts to 4,096 and the maximum number it can contain is 4,095. Preset selector switches 34 provide means for presetting any desired number up to 4,095 in counter 32. Preset switch 36 enables the number selected by preset selector switches 34 to be loaded into counter 32. Reset switch 38 clears counter 32 to zero. Up-ramp switch 40 and down-ramp switch 42 control the direction in which counter 32 will count, and upper-limit selector switch 44 can be used to limit the maximum count in counter 32 to some power of two less than 4,096, i.e. 2,048, 1,024, 512, and so on. The output of counter 32 is directed to digital-to-analog converter 46 which converts the digital count to an analog output and delivers it to analog to digital converter 48. The same output of counter 32 is also submitted to a binary coded decimal converter 50 which converts the count in counter 32 directly to the value of the voltage which it will produce at the output of digital-to-analog converter 46, and submits that binary coded decimal value to printer 52. Alternatively, the value of the voltage output from digital-to-analog converter 46 may be measured by a voltmeter 54, shown in phantom, such as a digital voltmeter whose output may be connected directly to printer 52. Thus, voltmeter 54 will provide a visual display to the operator of the system and also provide a signal to printer 52 similar to the signal from binary coded decimal converter 50. A display device 56 may be associated with binary coded decimal converter 50 to provide a visual output there as well. Digital-to-analog converter 46 may be a multiplying type converter which provides an analog output that is a multiple of the digital input in which case a reference circuit 58 is provided to supply the multiplying constant. Analog-to-digital converter 48 provides its output to printer 52. The least significant bit in analog-to-digital converter 48 is monitored by least significant bit change detector 60 which provides a write signal through jitter-bypass switch 62 upon the detection of a change in the least significant bit in analog-to-digital converter 48. That write signal on line 64 enables printer 52 to print the binary coded decimal value of the analog voltage actually being supplied by digital-to-analog converter 46 to analog-to-digital converter 48 and to print the simultaneous output of analog-to-digital converter 48. Simultaneously, the write signal on line 64 enables write circuit 66 to inhibit the operation of timer 12 to prevent the next cycle of operation from beginning until the printout of this cycle of information has been completed. Write circuit 66 is controlled by a recycle switch 68, delay switch 70, and single cycle switch 72. Recycle switch 68 permits the inhibit signal to automatically cease after a predetermined period of time, and delay switch 70 determines the duration of that period. Single cycle switch 72 causes write circuit 66 to deliver an inhibit signal to timer 12 until the circuit is manually interrupted. In this single cycle mode, the circuit can be made to function without printer 52 or similar apparatus; a human operator can take down with pencil and paper the value of the output of analog-to-digital converter 48 and the value of the voltage being simultaneously supplied to it by digital-to-analog converter 46. A jitter-bypass circuit 74 may be included in order to determine whether a change detected by least significant change detector 60 is a valid change relative to the direction in which the input to analog-to-digital converter 48 from digital-to-analog converter 46 is moving, i.e. up-ramp or down-ramp. This may be necessary to prevent spurious signals such as noise within the analog-to-digital converter 48 from effecting a change in the least significant bit of analog-to-digital converter 48 in the opposite direction from which analog-to-digital converter 48 is being driven by digital-to-analog converter 46, thereby producing an erroneous change detection in the least significant bit change detector 60. Jitter-bypass circuit 74 receives an input from least significant bit change detector 60 and from the next to least significant bit on line 76 from analog-to-digital converter 48. In addition, jitter-bypass circuit 74 receives on line 78 from ramp drive 30 information as to the direction in which counter 32 is counting and instructions dependent upon the condition of preset switch 36 and reset switch 38.

In operation, with timer 12 delivering clock signals to sequencer 22, and counter 32 reset to zero and instructed to count in the up direction to the full count, the first cycle of operation begins with the appearance of the first sequence signal on line 24 to ramp drive 30 which causes counter 32 to be incremented by one count from zero to one. The count of one in counter 32 is communicated to digital-to-analog converter 46 which immediately produces an analog voltage representative of the count of one and delivers it to analog-to-digital converter 48. Simultaneously therewith, the count of one is converted by the binary coded decimal converter 50 and submitted to printer 52. Upon the appearance of the second sequence signal on line 26, analog-to-digital converter 48 is enabled to accept the analog input voltage from digital-to-analog converter 46. And upon the appearance of the third sequence signal on line 28, least significant bit change detector 60 is enabled to detect whether a change has occurred in the least significant bit of analog-to-digital converter 48. If no change is detected the system recycles. With switch 62 in the position shown in FIG. 1, the jitter-bypass circuit 74 also monitors the next to the least significant bit on line 76 from analog-to-digital converter 48. Upon the determination that the change detected by the least significant bit change 60 is a proper one, a write signal is provided on line 64 by jitter-bypass circuit 74. That write signal causes write circuit 66 to inhibit timer 12 and the same write signal triggers printer 52 to print out the output of analog-to-digital converter 48 and the analog voltage provided to it by binary coded decimal converter 50. Since recycle switch 68 is set to recycle the system, the inhibit signal from write circuit 66 to timer 12 is removed and timer 12 once again begins providing signals to sequencer 22 and the cycle of operation may begin again. Either analog-to-digital converter 48 or digital-to-analog converter 46 may be the instrument under test, while the other is a reference instrument.

Write circuit 66, FIG. 3, includes a one-shot multivibrator 90 which recycles itself after a period determined by the value of the one of resistors $R_1$, $R_2$, $R_3$, and $R_4$ that is selected by means of delay switch 70. Recycle switch 68 may actually be one fixed contact and single cycle switch 72 the other fixed contact of a single pole double throw switch 94 whose swinging contact is connected to one-shot multivibrator 90 in the recycle position and to flip-flop 96 in the single cycle position. Thus, a write signal on line 64 is submitted to both one-shot multivibrator 90 and flip-flop 96 and both react thereto, but the desired recycling or single cycle operation is selected by means of switch 94. In single cycle operation, flip-flop 96 must be reset by means of reset switch 38 and other interconnecting circuitry not shown, after each cycle.

Timer 12 includes an oscillator 100 whose output is directed to counter 102. The operation of oscillator 100 may be suppressed by an inhibit signal on line 104 from write circuit 66. Various cycle times may be selected by means of cycle time switch 18 by selecting successive stages of binary counter 102 which will switch state and provide an output signal every second count, every fourth count, every eighth count, and so on. External input switch 20 may be constituted by an additional contact on switch 18. Sequencer circuit 22 includes a flip-flop 106 which transitions on the positive going portion of an input pulse, two inverters 108, 110, and two AND circuits 112, 114. Thus, the positive edge of the first input pulse in the series of input pulses switches flip-flop 106 so that its output on line 116 is in the zero state. In this condition, the zero output on line 116 is delivered on line 118 to both AND circuits 112 and 114, preventing outputs from either of those circuits. Simultaneously, the zero output on line 116 produces a one output on line 24 from inverter 110. During the remainder of the period of the first pulse and during the period of the first pulse and the second pulse, flip-flop 106 remains in this state, and the first sequence signal is present on line 24. Upon the positive portion of the second input pulse, flip-flop 106 switches state and the output on line 116 switches to a one. This causes inverter 110 to immediately provide a zero on line 24 cutting off the sequence signal on line 24, and provide enabling signals on line 118 to both circuits 112 and 114. During the period that the second input pulse is present, there is a second input on line 120 to AND circuit 114, and so the second sequence signal is provided on line 26 during this period. At the end of the second input pulse, while flip-flop 106 remains unswitched, inverter 108 provides a signal to AND circuit 112. Simultaneously, the disappearance of the second pulse cuts off the sequence signal on line 26 and provides the third sequence signal on line 28.

Figure 2:
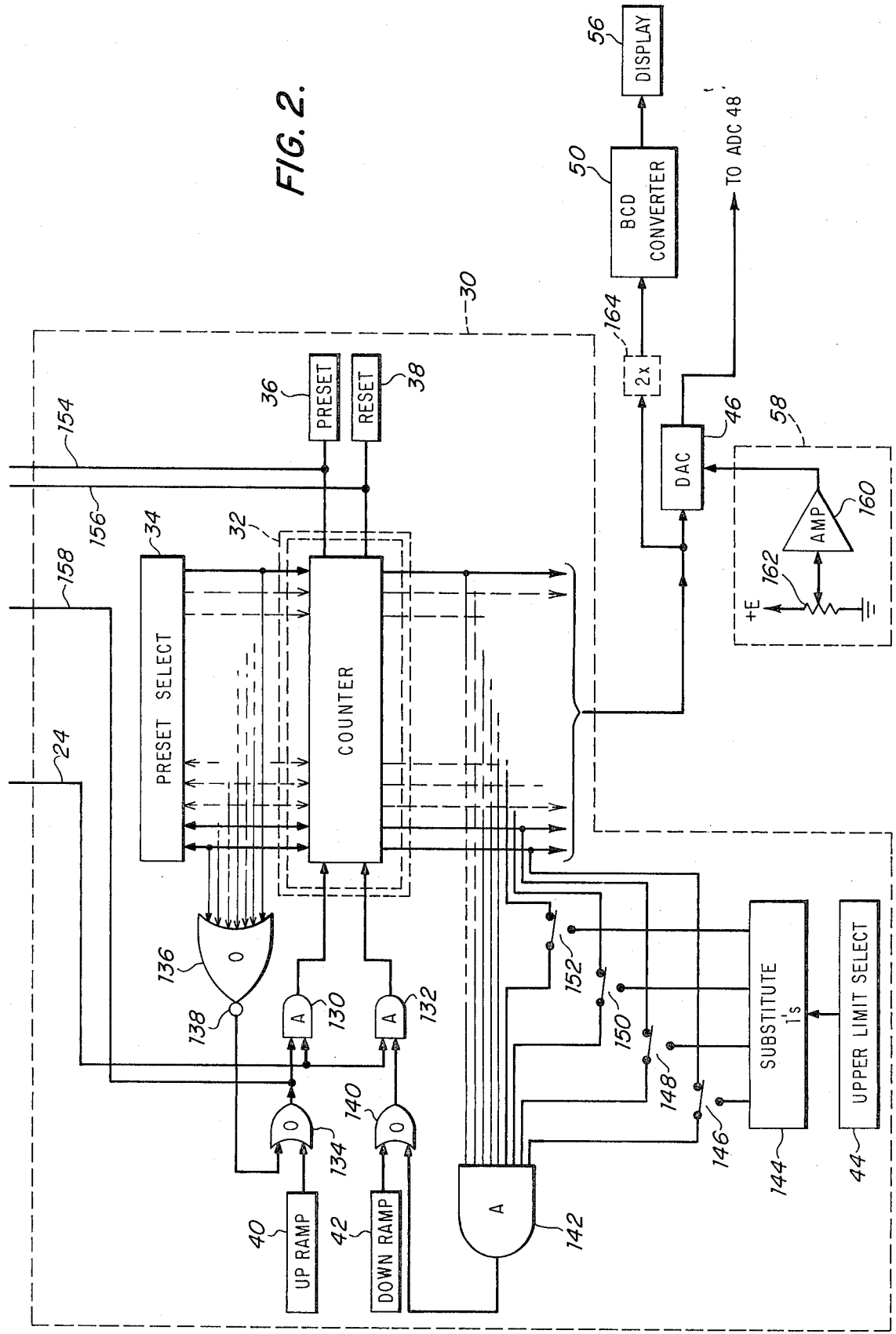
FIG. 2 is a more detailed diagram of a portion of the system of FIG. 1 including the ramp drive.

Ramp control 30, FIG. 2, includes AND circuit 130 which provides the count-up instruction to counter 32 and AND circuit 132, which provides the count-down instruction to counter 32. Both AND circuits 130 and 132 are enabled by the appearance of the first sequence signal on line 24. The other input to AND circuit 130 is provided by OR circuit 134, which derives its input from either one of two inputs, i.e. an instruction to count up from up-ramp switch 40 or an instruction from OR gate 136 whose twelve inputs are connected to the 12 stages of counter 32. If any one of the 12 stages of counter 32 has a one in it, OR circuit 136 will have an output which is inverted by inverter 138 and thus provides no signal to OR circuit 134. If, however, all of the stages of counter 32 contain zeros, OR circuit 136 will have no output which will be inverted by inverter 138 to provide an output to OR circuit 134. Thus, whenever counter 32 has counted down to zero, OR gate 136 and inverter 138 automatically cause a signal to AND circuit 130 to cause counter 32 to begin to count up. AND circuit 132 has its other output provided by OR circuit 140, which provides an output in response both to the actuation of down-ramp switch 42 and in response to a signal from 12 input AND circuit 142. AND circuit 142 is a 12 input AND circuit having its inputs connected to the 12 stages of counter 32. Thus, when there is a one present in each of the states of counter 32, AND circuit 142 provides an output to OR circuit 140. If, however, any one of the 12 stages does not contain a one, there is no output from AND circuit 142. Thus, when counter 32 has counted up all the way to its maximum count of 4,095, it automatically beings to count down again under the direction of AND circuit 142 controlling AND circuit 132. The upper-limit select switch 144 may be used to limit the maximum count to which counter 32 will count by means of a "substitute one" circuit 144 which merely supplies a voltage signal equivalent to a logic one voltage level in conjunction with a plurality of switches 146, 148, 150 and 152, for example, one in each of the lines connected to the four most significant stages of counter 32. Thus, by operating switch 146, the most significant stage of counter 32 will always have a one provided to it. Therefore, the input to AND circuit 142 from the most significant stage of counter 32 will always have a one provided to it. As a result, as soon as counter 32 reaches a count of 2,047, there will be all one's at the input of AND circuit 142, and counter 32 will reverse and begin to count downwardly. Likewise with switches 148, 150, and 152, set counter 32 will reverse its direction when it reaches the count of 255. The preset switch 36 and reset switch 38 inputs to counter 32 are also provided on lines 154 and 156, respectively, to jitter-bypass circuit 74 which also receives the output of OR circuit 134 on line 158 representing whether or not counter 32 is counting up. Reference circuit 58 may include an amplifier 160 receiving its input from a voltage divider 162 connected to source E+. In a specific embodiment and when an analog-to-digital converter 48 is being used which requires a zero to five volt input signal, a count of 4,096 provided to digital-to-analog converter 46 is insufficient where digital-to-analog converter 46 is set to provide 1 millivolt increase for each count, because that count would result in a total maximum output voltage of only 4,096 volts. As a practical matter this problem may be solved by setting the reference circuit 58 so that the input to digital-to-analog converter 46 is multiplied by two. Thus, for every count submitted to digital-to-analog converter 46, the analog voltage out of converter 46 will be increased by 2 millivolts: the total input to analog-to-digital converter 48 will be 8.192 volts. The maximum voltage will then be reduced to 5 volts by the use of upper-limit select switch 44 as described previously. Since each count received by digital-to-analog converter 46 will produce a 2 millivolt increase in its analog output voltage, the conversion made by binary coded decimal converter 50 will be an error unless each count provided to it is also doubled. Thus, a multiplier circuit 164 may be added to the circuit.

Jitter-bypass circuit 74 and least significant bit change detector 60 are shown combined in the single logic circuit, FIG. 3, including a pair of flip-flops, such as type D flip-flops 170 and 172. The value of the least significant bit and next to least significant bit in analog-to-digital converter 48 during the previous cycle are stored in flip-flops 170 and 172, respectively. The present values of the least significant bit and next to least significant bit are present on lines 174 and 176, respectively, and entered in flip-flops 170 and 172, respectively, upon the appearance of a write signal on line 64. Exclusive OR circuit 180 compares the present value of the least significant bit provided on line 182 with the previous value of the least significant bit provided on line 184 by flip-flop 170. If those two values are different, exclusive OR circuit 180 produces an output to AND circuit 186 which is enabled upon the appearance of the third sequence signal on line 28. At that time, AND circuit 186 provides an output to both AND circuits 188 and 190 and to AND circuit 192. The other input of AND circuit 192 on line 194 originates from jitter-bypass switch 62 which in the position shown in FIG. 3, enables AND circuit 192 and thereby suppresses the output of AND circuit 196 and thus also the output of jitter-bypass circuit 74.

The purpose of jitter-bypass circuit 74 may be better understood by reference to FIG. 4. Chart I includes two columns, the "next to least significant bit" column, NLSB, and "least significant bit" column, LSB, and a third column entitled "step" which indicates the number of steps made by the counter, i.e. zero, one, two, three, four, five, six, seven, and so on. In Chart I it is assumed that the counter is counting up and it can be seen that the zeros and ones alternate in the least significant bit column, that is, in steps zero, two, four, and six, the least significant bit has the value of zero, and in steps one, three, five, and seven, it has a value of one. Thus, for any particular step, for example, step two, the change in the least significant bit is the same in either direction. Thus, although in Chart I we expect the value of LSB to change from zero in step two to one in step three, the one detected by the least significant bit change detector 60 may instead be the one of step one. Whether or not this is true can be determined by looking at the next to least significant bit. That is, the value of the NLSB column in step three of Chart I. Thus, if the LSB in step two is zero and in step three the LSB value changes to one, that one will be a proper one only if the NLSB is also a one. If the NLSB is a zero, then the one to which the LSB changed is the one of the first step which, as can be seen from the NLSB column of Chart I, is accompanied by a zero. This method of detecting whether or not a change in the LSB is proper is effective for each of the four states formed by the NLSB and LSB, i.e. the zero zero, zero one, one zero and one one states. For a second example, pick the LSB of step three. The LSB must change to a zero, which can be either properly the zero of step four or, improperly, the zero of step two. If the present zero value of LSB is the proper one, there will also be present a zero in the NLSB. Whereas, if the zero detected in the NLSB is the improper zero of step two, then the NLSB would be a one. The same determination may be made when the counter is counting down, as shown in Chart II. If the least significant bit in step one has a value of zero, it is expected that the value will change to one in step two, but in order to detect whether the one is the proper one of step two, or the one of step zero, the value of the NLSB must also be inspected. Thus, if the NLSB has a value of zero, the value of the LSB is the proper one of step two; whereas if the NLSB has a value of one, the LSB is the improper one in step zero. In FIG. 3, the logic for this determination is performed by exclusive OR circuit 200 which has a one output when the previous value of the next to least significant bit provided on line 202 from flip-flop 172, and the previous value of the least significant bit provided on line 184 from flip-flop 170 are different. That is, they are either zero and one or one and zero, respectively. If that condition is met, an output is provided by exclusive OR circuit 200 to exclusive OR circuit 204 whose other input provided on line 206, is provided by the present value of the next to least significant bit provided on line 76. Thus, if the previous values of the least significant bit and the next to least significant bit are different, and the present value of the next to least significant bit is zero, or the previous values of the least significant bit and next to least significant bit are the same, and the present value of the next to least significant bit on line 206 is a one, the exclusive OR 204 has an output to AND circuit 188, and also to inverter 208. If the converse of those statements is true, the exclusive OR 204 will have zero output, which will be inverted by inverter 208 to provide an input to AND circuit 190. AND circuit 190 is further enabled by signal on line 158 when OR circuit 134 indicates that counter 132 is counting upward, FIG. 2, and AND circuit 188 receives an enabling input from line 158 through inverter 210 if OR circuit 134 indicates that counter 32 is not counting upward i.e. counting downward. Thus, either AND circuit 188 or 190 is enabled according to the direction in which counter 32 is counting. These enabling inputs, plus the input from AND circuit 186 indicating that there has been a change in the value of the least significant bit, and the input derived from exclusive OR circuit 204 enable one or the other of AND circuits 188 and 190 to provide an output to OR circuit 212, which in turn provides an output to AND circuit 196. If AND circuit 196 is enabled by the conditioning of jitter-bypass switch 62 in the opposite direction from that shown, then the output of AND circuit 196 will be delivered to OR circuit 214 and the output of AND circuit 192 will be inhibited. The output of OR circuit 214 provides the write signal on line 64. The signal on line 156 sets both flip-flops 170 and flip-flop 172 to the zero state upon the actuation of reset switch 38 which clears the system. Both flip-flops 170 and 172 are set to the one state by a signal on line 154 provided when preset switch 36 is actuated and all one's are loaded in counter 32. However, preset switch 36 may also be used to load counts other than the maximum in the counter 32. In that instance, and if the count loaded does not place one values in both the least significant bit and the next to least significant bit, the jitter-bypass circuit 74, if engaged, will not produce a write signal on line 64 until counter 32 reaches the state in which the one's loaded in flip-flops 170 and 172 are valid. Since there are only four such states which constantly repeat themselves as the system cycles, and since the presetting at any of those values of other than that maximum count are used only to focus on a specific area of interest in the converter under test, the loss of a maximum of three counts does not interfere significantly with the function of the system. As can be seen with reference to FIG. 3, the least significant bit change detector 60 is composed primarily of AND circuit 192, AND circuit 186, and exclusive OR circuit 180, while jitter-bypass circuit 74 is composed primarily of AND circuit 196, OR circuit 212, AND circuits 188 and 190, inverter circuit 208, and exclusive OR circuits 204 and 200, while flip-flops 170 and 172 and OR circuit 214 are common to both circuits.

Other embodiments will occur to those skilled in the art and are within the following claims:

What is claimed is:

1. An analog to digital converter testing system comprising:
a ramp drive for providing a series of test inputs to an analog to digital converter to be tested, including a counter, means for presetting said counter to a predetermined count, means for setting said counter to zero, means for controlling the direction of counting of said counter and means for setting the upper limit of said counter range;
means for enabling said converter under test to accept a test input and produce a digital output as a function thereof;
means for measuring the test input submitted to the converter under test;
means for detecting a change in the digital output of the converter under test; and
means, responsive to said means for detecting, for reading out the measured test input and simultaneous output of the converter under test.

2. An analog to digital converter testing system comprising:
means for providing a series of test inputs to an analog to digital converter to be tested;
means for detecting a change in the digital output of the converter under test;
means for enabling said converter under test to accept a test input and produce a digital output as a function thereof, said means for enabling including a control circuit having a timer circuit for providing timing signals at a preselected rate, a sequencer circuit, responsive to said timer circuit, for providing enabling signals to said converter under test, said means for providing a seris of test inputs, and said means for detecting a change and a write circuit for suppressing output from said timer circuit following detection of a change in the output of the converter under test;
means for measuring the test input submitted to the converter under test;
means, responsive to said means for detecting, for reading out the measured test input and simultaneous output of the converter under test.

3. An analog to digital converter testing system comprising:
means for providing a series of test inputs to an analog to digital converter to be tested;
means for enabling said converter under test to accept a test input and produce a digital output as a function thereof;
means for measuring the test input submitted to the converter under test;
means for detecting a change in the digital output of the converter under test, said means for detecting a change including a jitter bypass circuit for determining if the change in the least significant bit is in the proper direction; and
means, responsive to said means for detecting, for reading out the measured test input and simultaneous output of the converter under test.

4. The system of claim 3 in which said jitter bypass circuit includes means for comparing the present and the previous next to least significant bit and said least significant bit to determine if the detected change in the least significant bit is a proper one.

5. A digital to analog converter testing system comprising:
a ramp drive for providing a test voltage signal to a digital to analog converter to be tested, including a counter, means for presetting said counter to a predetermined count, means for setting said counter to zero, means for controlling the direction of counting of said counter and means for setting the upper limit of said counter range;

an analog to digital converter responsive to the output from the digital to analog converter under test;

means for enabling said analog to digital converter to accept an input from the digital to analog converter under test, and produce a digital output as a function thereof;

means for measuring the input to said analog to digital converter from the digital to analog converter under test;

means for detecting a change in the digital output of said analog to digital converter; and means, responsive to said means for detecting, for reading out the measured input and simultaneous output of said analog to digital converter.

6. A digital to analog converter testing system comprising:

means for providing a test voltage signal to a digital to analog converter to be tested;

an analog to digital converter responsive to the output from the digital to analog converter under test;

means for detecting a change in the digital output of said analog to digital converter;

means for enabling said analog to digital converter to accept an input from the digital to analog converter under test, and produce a digital output as a function thereof, said means for enabling including a control circuit having a timer circuit for providing timing signals at a preselected rate, a sequencer circuit, responsive to said timer circuit, for providing enabling signals to said analog to digital converter, said means for providing a test voltage signal, and said means for detecting a change, and a write circuit for suppressing output from said timer circuit following detection of a change in the output of the converter under test;

means for measuring the input to said analog to digital converter from the digital to analog converter under test;

means, responsive to said means for detecting, for reading out the measured input and simultaneous output of said analog to digital converter.

7. A digital to analog converter testing system comprising:

means for providing a test voltage signal to a digital to analog converter to be tested;

an analog to digital converter responsive to the output from the digital to analog converter under test;

means for enabling said analog to digital converter to accept an input from the digital to analog converter under test, and produce a digital output as a function thereof;

means for measuring the input to said analog to digital converter from the digital to analog converter under test;

means for detecting a change in the digital output of said analog to digital converter including a jitter bypass circuit for determining if the change in the least significant bit is in the proper direction; and means, responsive to said means for detecting, for reading out the measured input and simultaneous output of said analog to digital converter.

8. The system of claim 7 in which said jitter bypass circuit includes means for comparing the present and the previous next to least significant bit and said least significant bit to determine if the detected change in the least significant bit is a proper one.

9. An automatic converter testing system comprising:

a digital to analog converter;

a ramp drive for providing a test input to the digital to analog converter, including a counter, means for presetting said counter to a predetermined count, means for setting said counter to zero, means for controlling the direction of counting of said counter and means for setting the upper limit of said counter range;

an analog to digital converter responsive to the output from said digital to analog converter;

means for enabling said analog to digital converter to accept an input from the digital to analog converter and produce a digital output as a function thereof;

means for measuring the input to said analog to digital converter from said digital to analog converter;

means for detecting a change in the digital output of said analog to digital converter; and means, responsive to said means for detecting, for reading out the measured input and simultaneous output of said analog to digital converter; one of said converters being a reference instrument, the other being the instrument under test.

10. An automatic converter testing system comprising:

a digital to analog converter;

means for providing a test input to said digital to analog converter;

an analog to digital converter responsive to the output from said digital to analog converter;

means for detecting a change in the digital output of said analog to digital converter;

means for enabling said analog to digital converter to accept an input from the digital to analog converter and produce a digital output as a function thereof, said means including a control circuit having a timer circuit for providing timing signals at a preselected rate, a sequencer circuit, responsive to said timer circuit, for providing enabling signals to said analog to digital converter, said means for providing a test input and said means for detecting a change, and a write circuit for suppressing output from said timer circuit following detecting of a change in the output of the converter under test;

means for measuring the input to said analog to digital converter from said digital to analog converter;

means, responsive to said means for detecting, for reading out the measured input and simultaneous output of said analog to digital converter; one of said converters being a reference instrument, the other being the instrument under test.

11. An automatic converter testing system comprising:

a digital to analog converter;

means for providing a test input to said digital to analog converter;
an analog to digital converter responsive to the output from said digital to analog converter;
means for enabling said analog to digital converter to accept an input from the digital to analog converter and produce a digital output as a function thereof;
means for measuring the input to said analog to digital converter from said digital to analog converter;
means for detecting a change in the digital output of said analog to digital converter, said means for detecting a change including a jitter bypass circuit for determining if the change in the least significant bit is in the proper direction; and
means, responsive to said means for detecting, for reading out the measured input and simultaneous output of said analog to digital converter; one of said converters being a reference instrument, the other being the instrument under test.

12. The system of claim 11 in which said jitter bypass circuit includes means for comparing the present and the previous next to least significant bit and said least significant bit to determine if the detected change in the least significant bit is a proper one.

13. An analog to digital converter testing system comprising:
a digital to analog converter for supplying a test input to an analog to digital converter to be tested;
a counter for providing an input to said digital to analog converter;
a readout device for displaying the count produced by said counter and the output of the analog to digital converter under test in response to the test input supplied by said digital to analog converter derived from said count;
a least significant bit change detector for detecting that the least significant bit of the output of said analog to digital converter under test has changed in response to the test input; and
a control circuit, responsive to said least significant bit change detector for sequentially: transmitting to said readout device the digital output of said analog to digital converter under test, stepping said counter to provide a new count, and enabling said analog to digital converter under test to accept the next test input.

14. A digital to analog converter testing system comprising:
a counter for providing a test count to a digital to analog converter to be tested;
an analog to digital converter responsive to the analog output of said digital to analog converter under test to provide a digital output representative of the test count from said counter to the digital to analog converter to be tested;
a readout device for displaying the count produced by said counter and the output of said analog to digital converter in response to the output from the digital to analog converter under test derived from the test count;
a least significant bit change detector for detecting that the least significant bit of the output of said analog to digital converter has changed in response to the output from the digital to analog converter under test; and
a control circuit, responsive to said least significant bit change detector for sequentially: transmitting to said readout device the digital output of said analog to digital converter, stepping said counter to provide a new count, and enabling said analog to digital converter to accept the next output from said digital to analog converter.

15. An automatic converter testing system comprising:
a digital to analog converter;
a counter for providing an input to said digital to analog converter;
an analog to digital converter, responsive to the analog output of said digital to analog converter to provide a digital output representative of the input from said counter to said digital to analog converter;
a readout device for displaying the count produced by said counter and the output of the analog to digital converter in response to the input supplied by said digital to analog converter derived from said count;
a least significant bit change detector for detecting that the least significant bit of the output of said analog to digital converter has changed in response to the output from the digital to analog converter; and
a control circuit, responsive to said least significant bit change detector for sequentially: transmitting to said readout device the digital output of said analog to digital counter, stepping said counter to provide a new count, and enabling said analog to digital converter to accept the next input.

* * * * *